United States Patent
Coisnon

(10) Patent No.: US 6,625,967 B1
(45) Date of Patent: Sep. 30, 2003

(54) PICK-UP DEVICE FOR FARM MACHINE WITH V-SHAPED FRAME MEMBER

(75) Inventor: M. René Coisnon, Outarville (FR)

(73) Assignee: Idass (Societe Anonyme), Ormes (FR)

( * ) Notice: Subject to any disclaimer, the term of this patent is extended or adjusted under 35 U.S.C. 154(b) by 0 days.

(21) Appl. No.: 09/786,713

(22) PCT Filed: Sep. 8, 1999

(86) PCT No.: PCT/FR99/02135

§ 371 (c)(1),
(2), (4) Date: Mar. 8, 2001

(87) PCT Pub. No.: WO00/13481

PCT Pub. Date: Mar. 16, 2000

(30) Foreign Application Priority Data

Sep. 8, 1998 (FR) .............................................. 98 11193

(51) Int. Cl.[7] ...................... A01D 34/03; A01D 34/43; A01D 34/64
(52) U.S. Cl. ........................................ 56/15.8; 280/104
(58) Field of Search ................... 280/104, 64, 676, 280/677, 124.157, 682, 683; 180/22, 24.02, 24.08, 72, 85; 56/15.8

(56) References Cited

U.S. PATENT DOCUMENTS

| | | | | |
|---|---|---|---|---|
| 2,025,793 A | * | 12/1935 | Tschappat | 280/124.157 |
| 2,842,326 A | * | 7/1958 | Sharples | 244/103 R |
| 3,313,555 A | * | 4/1967 | Reimer | 280/104 |
| 3,349,863 A | * | 10/1967 | Wagner | 180/24.08 |
| 3,653,455 A | * | 4/1972 | Hetteen | 180/85 |
| 3,756,619 A | * | 9/1973 | Thorsell | 280/104 |
| 3,809,004 A | * | 5/1974 | Leonheart | 180/21 |
| 4,397,473 A | * | 8/1983 | Miles et al. | 280/664 |
| 4,647,067 A | * | 3/1987 | Paquette et al. | 280/676 |
| 4,817,747 A | * | 4/1989 | Kopczynski | 180/22 |
| 4,840,394 A | * | 6/1989 | Bickler | 280/677 |

FOREIGN PATENT DOCUMENTS

| | | |
|---|---|---|
| DE | 12 23 599 | 8/1966 |
| DE | 88 11 010 | 10/1988 |
| DE | 40 03 203 | 8/1990 |
| EP | 0 386 430 | 9/1990 |
| EP | 0 614 604 | 9/1994 |

* cited by examiner

*Primary Examiner*—Arpád Fáb Kovács
(74) *Attorney, Agent, or Firm*—Young & Thompson

(57) ABSTRACT

A running device for a trailer type machine and in particular a pick-up, arranged at each end thereof. The device includes at least a front wheel (43) and a rear wheel (37) whereof the axles are made integral with at least a frame member (31, 33) linked to the machine body (5) which is mounted rotating relative to the body (5) thereof about an axis (xx', 23) parallel to that of the wheels (37, 43).

5 Claims, 2 Drawing Sheets

PICK-UP DEVICE FOR FARM MACHINE WITH V-SHAPED FRAME MEMBER

BACKGROUND OF THE INVENTION

The present invention relates to a running device for farm machine and in particular for machines intended for collecting swaths on the ground of the pick-up type which are pushed by a self-propelled machine, such as a silo filler.

It is known that cultivated ground on which machines of this type have to move usually presents particularly uneven surfaces of which the hollows and bumps impart to the pick-up, during its displacement, repetitive shocks which have a detrimental effect on the integrity thereof.

In the prior state of the art, farm machines have been proposed, equipped at each of their ends with running means constituted by a front wheel and a rear wheel whose axles are connected by a rectilinear frame member articulated at its centre on the machine body, which has the effect of ensuring a "smoothing" of the curve of the land travelled over.

SUMMARY OF THE INVENTION

The present invention has for its object to improve the devices of this type by proposing a device which makes it possible to arrange on this type of machine wheels whose diameter is greater than that usable in the prior state of the art, which has the effect of increasing the contact surface thereof with the ground.

The present invention thus has for its object a running device for trailer-type machine, particularly a pick-up, arranged at each end thereof, comprising at least one front wheel and one rear wheel of which the axles are made integral with at least one frame member which is mounted for rotation relative to the body of the machine, about an axis parallel to that of the wheels, characterized in that this frame member is in the form of a V so that the axis of rotation of this frame member on the machine body is located below the axis of rotation of each of the wheels. Said axis of rotation of the frame member is preferably located at the level of the intersection of the two branches of the V.

The device may comprise two wheels which may for example be located in the same plane. However, it is equally possible that at least one of the wheels of one of the ends, front or rear, is not disposed in the same plane as one of the wheels of the other end.

In one form of embodiment of the invention, at least one front wheel lies outside the machine and at least one of the rear wheels lies inside, therebeneath.

In another form of embodiment of the invention, the device comprises means for adjusting the difference in height separating the axis of rotation of the frame member and the axis of rotation of a wheel. The adjusting means may be such that the frame member comprises an outer longitudinal element extending fowardly and an inner longitudinal element extending rearwardly, at least one of these longitudinal elements being provided, at its free end, with means for fixing an adjusting plate on which a hub supporting a wheel is mounted.

One of the advantages of the pick-up according to the invention is that it makes it possible to increase the contact surface of the wheels with the ground. Such an increase is due firstly to the addition of at least one second wheel. But, in addition, the present invention allows a running device to be produced in which the point of application of the effort which is transmitted to the wheels is nearer the ground that the axis of rotation of these wheels. Apart from the fact that the stability is thus improved, this results in it then being possible to mount on the machine wheels whose diameter is larger than that usable in the prior state of the art, which has the effect of increasing the contact surface of said wheels with the ground and of improving the adherence of the machine.

Furthermore, when, as shown in FIG. 1, one of the front wheels of a pick-up equipped with a running device according to the invention, encounters a small obstacle of height h, the point of application A of the efforts between the wheels and the machine body moves, for its part, by a height which is in the ratio of the corresponding lever arms, i.e. those constituted, on the one hand, by the distance of the axle of the wheel in question with the point of application A and, on the other hand, the distance of this same axle with that of the other wheel. Thus, if the supporting point lies at an equal distance between the two wheels, such a displacement will thus be equal to h/2, that is, half the height h of the obstacle.

The present invention also makes it possible to improve ground adherence of the pick-up by enabling the front and rear wheels thereof to be easily offset in the two different vertical planes. Under these conditions, it will be understood that, as the rear wheel has a different runway from that of the front wheel, it will come into contact with virgin ground since the latter will not have suffered the passage of the front wheel.

BRIEF DESCRIPTION OF THE DRAWINGS

A form of embodiment of the present invention will be described hereinafter by way of non-limiting example, with reference to the accompanying drawings, in which.

DESCRIPTION OF THE PREFERRED EMBODIMENTS

Figure 2:
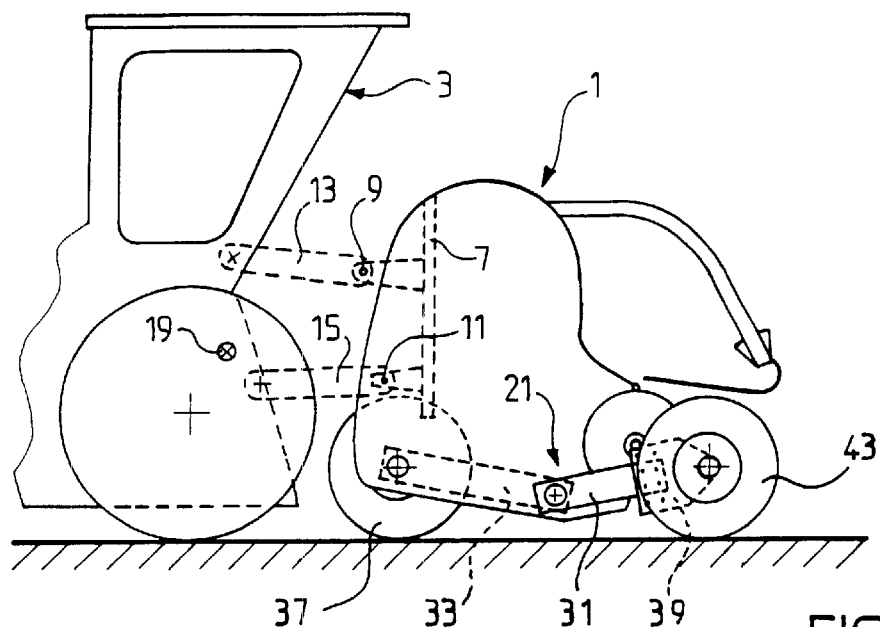
FIG. 2 is a side view of a swath collecting device equipped with the running device according to the invention and with a partially shown driving silo filler.
Figure 3:
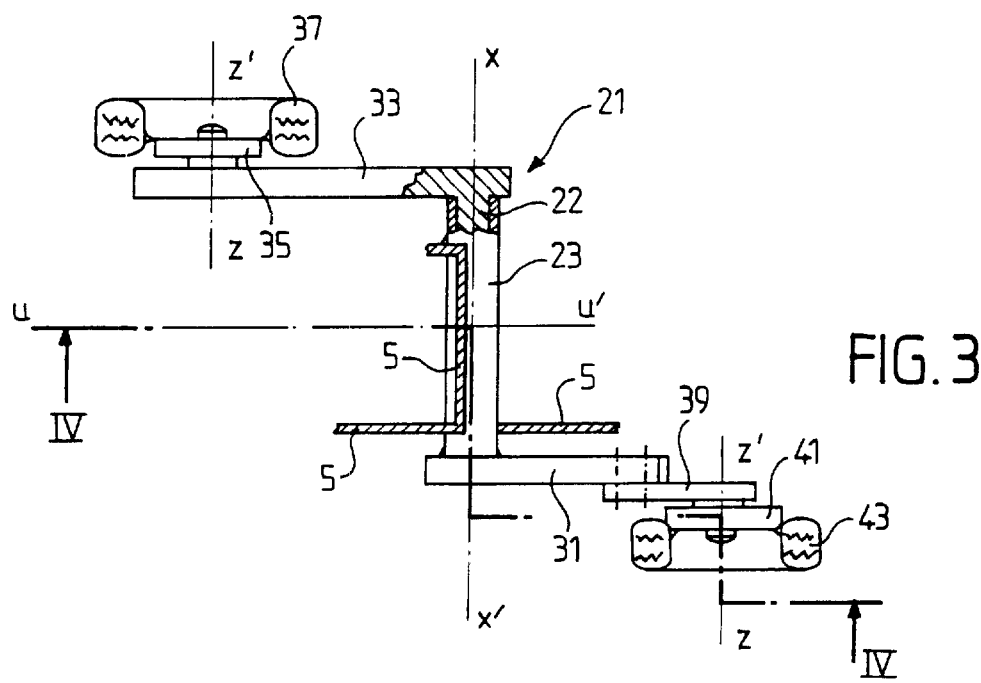
FIG. 3 is a partial schematic plan view in section of a variant embodiment of the running device according to the invention shown in FIG. 2.
Figure 4:
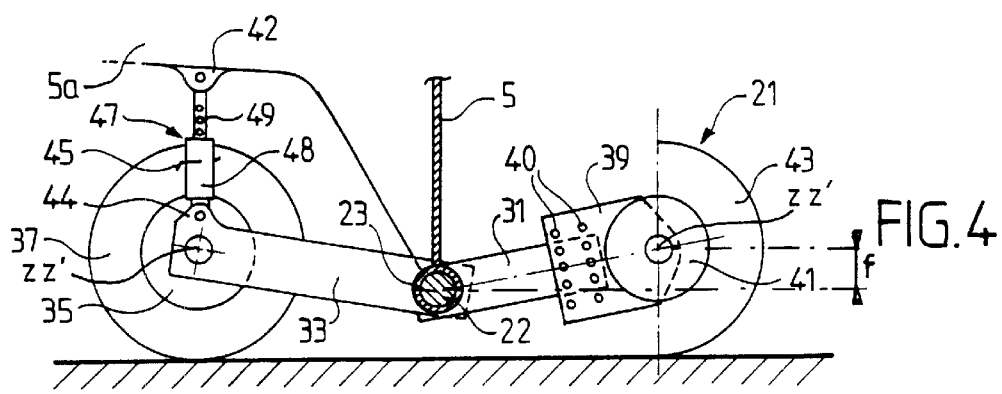
FIG. 4 is a partial vertical sectional view of the device shown in FIG. 3 along line IV—IV thereof.
Figures 7, 8:
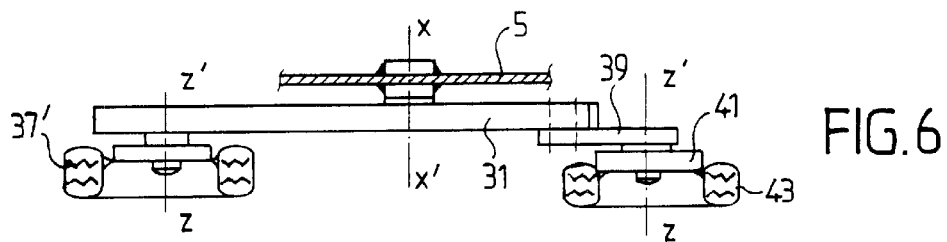
FIGS. 7 and 8 are schematic side views of a pick-up placed in raised position by a driving silo filler, shown partially, respectively before and after tipping of the running device according to the invention.

FIGS. 2 to 4 show a swath collecting device 1, or pick-up, of which the displacement is ensured by a silo filler 3 shown partially in the drawing. The pick-up 1 is constituted by a machine body 5 which is fixed to the silo filler 3 via an oscillating frame 7 which constitutes a fixation device known by the prior state of the art. This oscillating frame 7 is fixed to the silo filler by two anchoring points 9 and 11 by means of two respective holding couplings (shown schematically in the Figures) namely an upper coupling 13 being fixed to the anchoring point 9 and a lower coupling 15 which is fixed to the lower anchoring point 11. The means for fixation of the pick-up on the silo filler make it possible, in position of non-use, to pivot the pick-up about a pivot axis 19 of the silo filler, as shown in FIGS. 7 and 8.

Each of the transverse ends of the pick-up 1 is provided with a running device 21 which is intended to ensure the displacement of the pick-up 1 over the ground during work, when the latter is pushed by the silo filler 3.

The running device 21 according to the invention comprises a wheel supporting frame member mounted to rotate on the machine body 5 about a horizontal and transverse axis xx', this support being essentially constituted by a transverse shaft 22 made fast, at each of its ends, with at least one tubular longitudinal element of rectangular section, namely an anterior longitudinal element 31 which extends towards the outside of the pick-up and a posterior longitudinal element 33 which extends therebeneath.

The shaft 22 is rotatably mounted inside a tubular element 23 fast with the machine body 5. The posterior longitudinal element 33 is provided, at its free end, with a hub 35 supporting a rear wheel 37 of axis zz' and the anterior longitudinal element 31 is provided, at its free end, with means for fixing an adjusting plate 39 on which is mounted a hub 41 supporting a front wheel 43 of axis zz'. The adjusting plate 39 is fixed on the anterior longitudinal element 31 by bolting and comprises an assembly of holes 40 for fixing this plate 39 on the longitudinal element 31, at different positions more or less distant from the base of the pick-up, so as to adjust the wheel 43 in height and consequently adjust the ground clearance of the front part of the pick-up. The ground clearance of the wheel 43 might also be adjusted by any other means. For example, the end of the shaft 22 may be provided with flutings and the end of the longitudinal element 31 opposite the wheel 43 with a recess of complementary shape allowing it to be given a plurality of possible angular positions with respect to the shaft 22.

According to the invention, as is more particularly visible in FIGS. 2 and 4, the anterior (31) and posterior (33) longitudinal elements of the running device present, seen in the horizontal and transverse direction, a shape in V-form or more precisely an upwardly open obtuse angle. In this way, the axis of rotation xx' of the wheel supporting frame member which is located at the apex of the V or of the obtuse angle, is positioned beneath the axis of rotation of each of the anterior and posterior wheels at a distance f from the axis zz' thereof, which makes it possible to use wheels of larger diameter than would be possible to do if the longitudinal elements 31 and 33 were rectilinear.

The machine body part 5a located above the rear wheel 37 comprises a flange 42 for fixation, in the same way as the upper posterior part of the longitudinal element 33 which presents a flange 44. Between these two flanges 42 and 44 there has been disposed an adjustable connecting rod 47 constituted by a tubular body 48 of which one end is fixed on the lower flange 44 inside which is slidably mounted a piston 49 of which the free end is articulated on the flange 42. Connection of the body 48 and of the piston 49 is effected by a transverse pin 45 which passes through the connecting rod body 48 and one of a series of transverse holes made over the length of the piston 49, which makes it possible to connect the longitudinal element 33 of the machine body 5 in position of transport of the pick-up.

When the pick-up is in work position, it is held by the silo filler 3 by means of the upper (13) and lower (15) couplings, and its machine body 5 may pivot in the plane constituted by the intermediate holding frame 7, and the running device constituted at each of its transverse ends by one or two longitudinal elements and the wheels which are fixed thereto, may pivot about the axis of rotation constituted by the tubular element 23, which enables it to adapt itself easily to the different relief of the ground that it encounters during its displacement.

Figure 1:
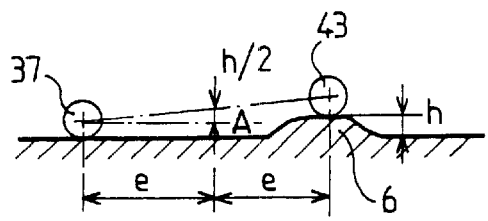
FIG. 1 schematically illustrates one of the advantages of the invention.

Furthermore, as shown in FIG. 1 when one of the front wheels 43 encounters an obstacle 6 of height h, the running device pivots about an axis constituted by that of its rear wheel 37, so that the tubular articulation element 23, connected to the machine body 5 of this pick-up, undergoes for its part a vertical displacement substantially equal to half the height h when the longitudinal elements 33 and 31 have substantially identical lengths e. It will be understood that such a device makes it possible very substantially to minimize the stresses to which the machine is thus subjected.

Furthermore, and as mentioned hereinbefore, the device according to the present embodiment makes it possible to improve the contact of the rear wheels 37 with the ground, insofar as said wheels are made to run over virgin contact surfaces, i.e. surfaces over which the front wheel 43 did not itself move.

As shown in FIGS. 7 and 8, it is observed that, when the work of the pick-up is finished, the lower (15) and upper (13) couplings of the silo filler are displaced into upper position, causing the pick-up to make a rotation centred on the axis of rotation 19 of the silo filler 3. Consequently, the pick-up tends to occupy a position of the type such as shown in FIG. 7, in which its front wheels 43 are located at a level higher than those of the rear wheels 37, which implies that the ground clearance of the latter is relatively reduced.

The running device according to the invention, insofar as it may pivot about the transverse tubular element 23, makes it possible to increase the ground clearance of the pick-up in raised position. In effect, it will be arranged for the weight of the front wheel 43 of the anterior longitudinal element 31 and of the plate 39 to be greater than the weight of the posterior longitudinal element 33 and of the wheel 37, so that, once the pick-up is raised, as shown in FIG. 7, the running device pivots about the transverse element 23 thus causing the front wheel to descend and the rear wheel 37 to rise, in order to take a position such as the one shown in FIG. 8. It is observed that, under these conditions, for an identical lifting procured by the silo filler, the ground clearance of the pick-up is very clearly improved.

Figure 5:
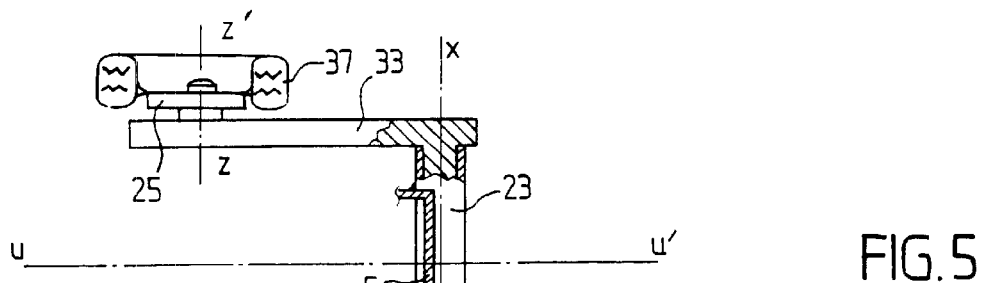
FIG. 5 is a partial schematic plan view in section of a variant embodiment of the running device according to the invention.
Figure 6:
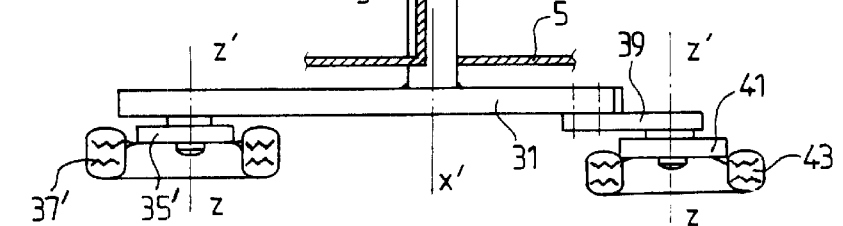
FIG. 6 is a plan view of another variant embodiment of the running device according to the invention.

When it is desired to improve the contact of the running device with the ground, it is possible, as shown in FIG. 5, to extend the longitudinal element 31 towards the rear so that the free end thereof receives a hub 35' provided with a wheel 37'. It will preferably be arranged that the two rear wheels 37 and 37' be symmetrical with respect to the longitudinal axis uu' passing through the centre of the tubular element 23.

When, in applications where the wheels of the machine do not present any problem as to their adherence with the ground over which the latter is moving, the running device according to the invention may present only two wheels, namely a front wheel 43 and a rear wheel 37', these two wheels being disposed on the same longitudinal element 31 so that they thus lie in the same plane.

What is claimed is:

1. A running device for trailer-type machine, the device comprising:

at least one front wheel (43) and one rear wheel (37) having axles that are integral with a pair of frame members (31, 33) which are mounted for rotation relative to a machine body (5) about an axis (xx' 22) parallel to axes of rotation of the wheels (37, 43), wherein the pair of frame members (31, 33) is in the form of a V so that the axis of rotation (xx', 22) thereof is located below axes of rotation (zz') of the wheels (37, 43), the axis of rotation (xx') of the pair of frame members is located at a level of an intersection of two branches of the V, and means for adjusting a difference in height (f) existing between the axis of rotation (xx') of one of the pair of frame members and the axis of rotation (zz') of one of the wheels (37, 43), in which at least one of the pair of frame members comprises an anterior longitudinal element (31) and a posterior longitudinal element, wherein at least one of these longitudinal elements (31) is provided, at its free end, with an adjusting plate (39) on which is mounted a hub (41) supporting one of the wheels (43).

2. The device according to claim 1, wherein the adjusting plate (39) is arranged on the anterior longitudinal element (31).

3. A running device for a trailer-type machine, the device comprising:

a V-shaped frame member that is rotatably mounted on a machine body about a first axis of rotation adjacent to an apex of said V-shaped frame member, said V-shaped frame member being defined by an anterior longitudinal element and a posterior longitudinal element that meet at said apex;

a front wheel having a second axis of rotation on said anterior longitudinal element;

a rear wheel having a third axis of rotation on said posterior longitudinal element;

said first axis of rotation being parallel to and below said second and third axes of rotation; and an adjusting plate attached to one of said longitudinal elements for adjusting a position of a respective one of said second and third axes of rotation relative to said first axis, said adjusting plate having mounted thereon a hub supporting a respective one of said front and rear wheels.

4. A running device for trailer-type machine, the device comprising:

at least one front wheel (43) and one rear wheel (37) having axles that are integral with a pair of frame members (31, 33) which are mounted for rotation relative to a machine body (5) about an axis (xx' 22) parallel to axes of rotation of the wheels (37, 43), wherein the pair of frame members (31, 33) is in the form of a V so that the axis of rotation (xx', 22) thereof is located below axes of rotation (zz') of the wheels (37, 43), means for adjusting a difference in height (f) existing between the axis of rotation (xx') of the frame member and the axis of rotation (zz') of one of the wheels (37, 43), and at least one of the pair of frame members comprises an anterior longitudinal element (31) and a posterior longitudinal element, at least one of these longitudinal elements (31) provided at its free end with an adjusting plate (39) on which is mounted a hub (41) supporting one of the wheels (43).

5. The device according to claim 4, wherein the adjusting plate (39) is arranged on the anterior longitudinal element (31).

* * * * *